United States Patent

Kurauchi et al.

[11] Patent Number: 6,147,729
[45] Date of Patent: Nov. 14, 2000

[54] LCD HAVING STACKED COLOR FILTER SPACERS IN WHICH SOME SPACERS ARE CONTINUOUS WITH A COLOR FILTER LAYER AND OTHERS ARE NOT

[75] Inventors: Shoichi Kurauchi, Yokohama; Daisuke Miyazaki, Kamakura; Hitoshi Hatoh; Teruyuki Midorikawa, both of Yokohama, all of Japan

[73] Assignee: Kabushiki Kaisha Toshiba, Kawasaki, Japan

[21] Appl. No.: 08/959,519

[22] Filed: Oct. 28, 1997

[30] Foreign Application Priority Data

Oct. 29, 1996 [JP] Japan ................... 8-287076

[51] Int. Cl.⁷ ................ G02F 1/1335; G02F 1/1339
[52] U.S. Cl. .................................. 349/106; 349/155
[58] Field of Search ............................. 349/106, 155

[56] References Cited

U.S. PATENT DOCUMENTS

| | | | |
|---|---|---|---|
| 5,748,266 | 5/1998 | Kodate | 349/39 |
| 5,757,451 | 5/1998 | Miyazaki et al. | 349/106 |
| 5,815,232 | 9/1998 | Miyazaki et al. | 349/155 |

FOREIGN PATENT DOCUMENTS

| | | |
|---|---|---|
| 4-93924 | 3/1992 | Japan . |
| 7-281195 | 10/1995 | Japan . |

*Primary Examiner*—Walter Malinowski
*Attorney, Agent, or Firm*—Finnegan, Henderson, Farabow, Garrett & Dunner, L.L.P.

[57] ABSTRACT

A color filter substrate and a liquid crystal display device having high opening ratio and capable of preventing unsatisfactory display as far as possible are provided.

The color filter substrate used for the liquid crystal display device comprises a substrate portion, a color filter portion composed of colored layers of plural colors disposed on the substrate portion, a first spacer portion caused to be of a structure such that colored layers of at least two different colors of the colored layers of the plural colors are stacked on the substrate portion and one colored layer of the stacked colored layers and the colored layer of the same color as that of the one colored layer of the color filter portion are continuous with each other, and a second spacer portion caused to be of a structure such that the colored layers of at least two different colors of the colored layers of the plural colors are stacked on the substrate portion and all of the stacked colored layers are discontinuous with respect to any one of the colored layers constituting the color filter portion.

16 Claims, 7 Drawing Sheets

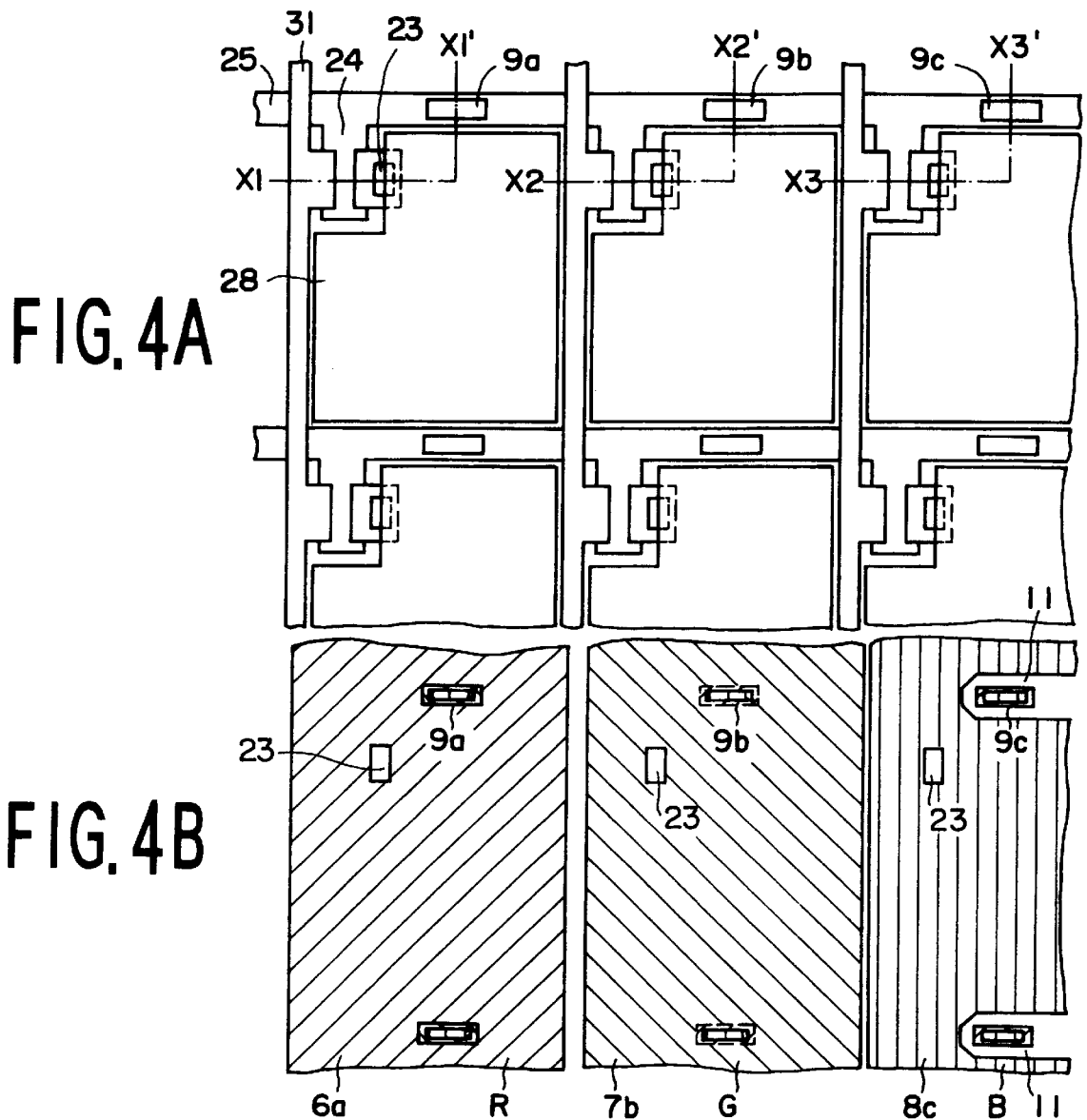

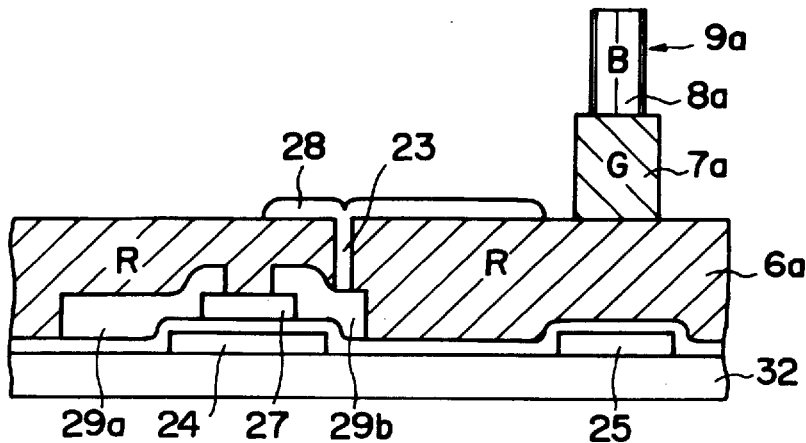
X1-X1' CROSS SECTION
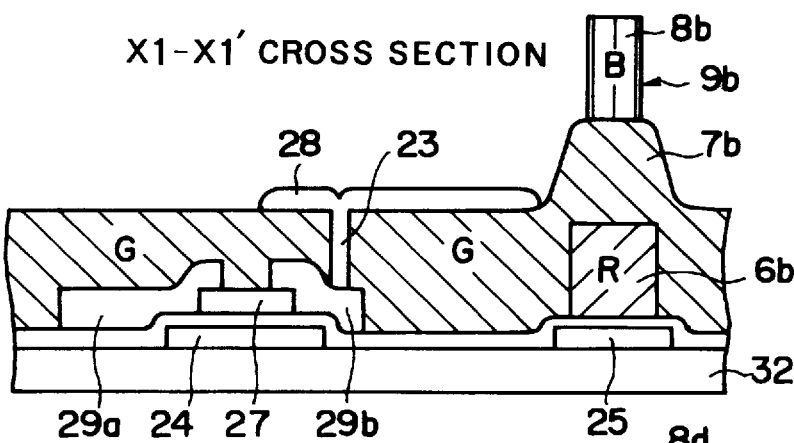
X2-X2' CROSS SECTION
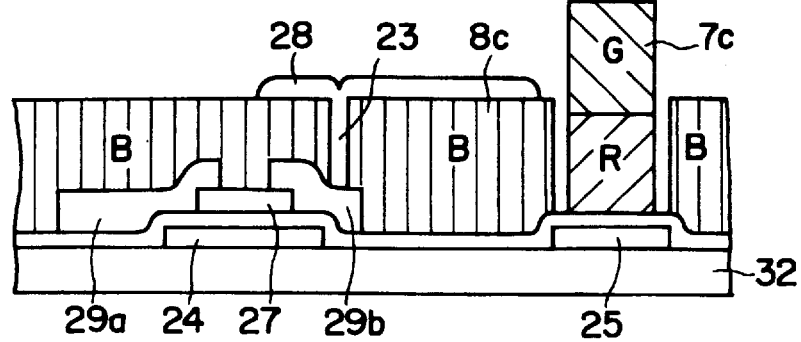
X3-X3' CROSS SECTION
FIG. 5A
FIG. 5B
FIG. 5C

LCD HAVING STACKED COLOR FILTER SPACERS IN WHICH SOME SPACERS ARE CONTINUOUS WITH A COLOR FILTER LAYER AND OTHERS ARE NOT

FIELD OF THE INVENTION

This invention relates to a color filter substrate and a liquid crystal display device.

PRIOR ART

Liquid crystal display devices generally used are of a structure in which liquid crystal is put or held between two glass substrates respectively having electrodes, the peripheries of the two substrates are fixed by adhesive agent in a manner except for the liquid-crystal filling hole, and the liquid crystal filling hole is hermetically sealed by sealing agent. Moreover, as spacer for allowing the distance between these two substrates to be held or kept constant, plastic beads of uniform particle diameter, etc. are scattered between the substrates.

However, in such liquid crystal display devices, at the process step for scattering spacers between two substrates, spacers are unequally disposed so that display becomes unsatisfactory, resulting in lowered yield.

In view of the above, in the color type liquid crystal display device, as shown in FIG. 6, colored layers R, G, B serving as color filters were respectively extended to the portions outside the pixel regions on a substrate 50 to stack these colored layers R, G, B at the portions except for the pixel regions to use the colored layers thus stacked as respective spacers to thereby eliminate the above-described problems.

However, in the liquid crystal display device of the structure in which colored layers R, G, B are stacked to thereby form spacers, there is the problem that the layer formed in such a manner that the uppermost layer of the spacer portion and the colored layer on the pixel area are continuous, e.g., the colored layer B is such that it is generally difficult to control the width dimension W of the spacer portion, and there are also instances where the width dimension W becomes great so that the spacer portion is admitted into the pixel region, resulting in reduced aperture ratio. Moreover, since the colored layer B is formed in such a manner that the uppermost layer of the spacer portion and the colored layer on the pixel region are continuous, in the case where orientation film is formed on the colored layer B, unsatisfactory orientation is apt to take place in the orientation film on a boundary region 60 (see FIG. 6) between the colored layer on the pixel region and the spacer portion. For this reason, in the case where the region where such unsatisfactory orientation has taken place is admitted into the pixel region, the problem that there results unsatisfactory display takes place.

SUMMARY OF THE INVENTION

This invention has been made in consideration of the above-mentioned circumstances, and its object is to provide a color filter substrate and a color liquid crystal display device having high aperture ratio and capable of preventing unsatisfactory display as far as possible.

A color filter substrate of this invention is characterized in that it comprises: a substrate; a color filter portion composed of colored layers of plural colors disposed on the substrate; a first spacer portion constituted so that the colored layers of at least two different colors of the colored layers of the plural colors are stacked on the substrate, and one colored layer of the stacked colored layers and the colored layer of the same color as that of the one colored layer of the color filter portion are continuous with each other; and a second spacer portion constituted so that the colored layers of at least two different colors of the colored layers of the plural colors are stacked on the substrate, and all of these stacked colored layers become discontinuous with respect to any one of the colored layers constituting the color filter portion.

In other words, the first spacer portion is such that either one of colored layers of two colors constituting the spacer portion is continuous from the colored layer constituting the color filter portion, and the second spacer portion is such that both of the colored layers of two colors constituting the spacer portion are spaced from the colored layer constituting the color filter portion when viewed from the plane.

Moreover, the liquid crystal display device of this invention is characterized in that it includes the above-mentioned color filter substrate.

At the spacer portion where the uppermost layer is disposed in such a manner that it covers the stacked colored layers except for the uppermost layer, the thickness of the spacer portion changes by the mutual relationship between viscosity of colored layer material of the uppermost layer and the thickness or height of the spacer portion of the colored layers except for the uppermost layer, etc. For this reason, control of the width of the spacer portion is difficult. However, in the color filter substrate and the liquid crystal display device of this invention, there is provided the second spacer portion of the structure in which the uppermost layer of the colored layers constituting the spacer portion is discontinuous with respect to any one of the colored layers constituting the color filter portion, i.e., is spaced therefrom when viewed from the plane. For this reason, it is sufficient to control only the shape of the uppermost layer of the spacer portion. Thus, it is possible to easily control the width of the spacer portion so as to take arbitrary shape.

This invention is effective particularly in the case where there is employed the structure to dispose spacer portion such that colored layers are stacked within the pattern region of the colored layers of the color filter portion. For example, in the case where the spacer portions are formed simultaneously with formation of colored layers constituting the color filter portion and the spacer portions are disposed within the colored layer regions every respective colors of the color filter portion composed of colored layers of three colors, when the colored layer of the uppermost layer constituting the spacer portion and the colored layer of the color filter portion where that spacer portion is disposed have the same color, the uppermost layer of the spacer portion and the colored layer pattern where that spacer portion is disposed are caused to be discontinuous as in the case of the second spacer portion, whereby control of the spacer width of the uppermost layer becomes easy. Thus, it becomes possible to control the unsatisfactory orientation region resulting from the fact that the spacer portion exists within a narrow range.

Moreover, since at least one layer of the colored layers constituting the first spacer portion takes a form continuous with the colored layer constituting the color filter portion, the region where no colored layer is formed does not exist in any sense within the pattern region of the colored layers of the color filter portion, thus making it possible to prevent missing of light from the region where no colored layer is formed. Further, there is employed the structure in which the colored layer of the lower layer side of the first spacer portion is continuous from the colored layer constituting the color filter portion, whereby since the uppermost layer and the colored layer of the color filter portion are discontinuous at the first spacer portion where the colored layer of the uppermost layer constituting the spacer portion and the colored layer of the color filter portion where that spacer portion is disposed have not the same color, control of the spacer width becomes easy.

As stated above, the color filter substrate and the liquid crystal display device of this invention include the first spacer portion including colored layer continuous with the colored layer of the color filter portion and the second spacer portion including discontinuous colored layer with respect thereto to thereby form the spacer portions and the color filter portion at the same time, thus making it possible to easily control the width of the spacer portion so that the spacer portion can be disposed at an arbitrary position.

Further, another color filter substrate of this invention is characterized in that it comprises: a substrate; a color filter portion composed of colored layers of plural colors disposed on the substrate; and a spacer portion where the colored layers of at least two different colors of the colored layers of the plural colors are stacked on the substrate, wherein the colored layer of the same color as that of the colored layer of the uppermost layer constituting the spacer portion of the color filter portion has an opening portion and the colored layer of the uppermost layer constituting the spacer portions disposed at the opening portion of the spacer portion is discontinuous with respect to the colored layer having the opening portion. It is to be noted that the opening portion mentioned here includes both cut portion provided at the colored layer of the color filter portion or hole opened therein.

In addition, another liquid crystal display device of this invention is characterized in that it includes the color filter substrate featured above.

In the case where when the spacer portion is disposed on the colored layer of the color filter portion of the same color as that of the colored layer of the uppermost layer constituting the spacer portion, there is no opening portion at the colored layer of the color filter portion, i.e., the uppermost layer of the spacer portion and the colored layer of the color filter portion are continuously disposed, the spacer portion is constituted in such a manner that the uppermost layer covers the stacked colored layers except for the uppermost layer. In this case, since the thickness of the spacer changes by the mutual relationship between viscosity of the colored layer material of the uppermost layer and the thickness or height of the spacer portion of the colored layers except for the uppermost layer, control of the width of the spacer portion is difficult. However, as in this invention, opening portion is provided at the colored layer of the color filter portion of the same color as that of the colored layer of the uppermost layer constituting the spacer portion to form the spacer portion at this opening portion, thereby making it possible to dispose the colored layer constituting the uppermost layer of the spacer portion in a manner spaced from the colored layer of the color filter portion. For this reason, it is sufficient to control only the shape of the uppermost layer of the spacer portion. Thus, it is possible to dispose the spacer portion within the pattern region of the colored layers of the color filter portion while easily controlling the width of the spacer portion.

Moreover, these color filter substrates of this invention are such that color filter portion including colored layers corresponding to adjacent pixels is, e.g., the color filter portion in the stripe form where colored layers are continuous by the same color. Such a structure is effective in the case where the spacer portion is disposed between adjacent pixels on the color filter portion.

In this case, this similarly applies not only to the case where the colored layers constituting the color filter have three colors, but also to the case where the color filter is formed by colored layers of two colors, or four colors or more.

Further, the uppermost layers constituting respective spacer portions are caused to be disposed within the regions where other layers constituting those spacer portions overlap with each other, whereby the effective thickness of the spacer which supports the portion between two substrates when constituted as the liquid crystal display device is the thickness of the spacer of the uppermost layer. Thus, the thickness of the uppermost layer constituting the spacer portion is only taken into consideration, thereby making it possible to control the thickness of the spacer which supports the distance between two substrates. As a result, the number of spacers and distribution thereof can be easily controlled. Thus, design with high degree of freedom can be carried out. Moreover, the uppermost layers constituting respective spacer portions are disposed within the regions where other layers constituting those spacer portions overlap with each other, and the colored layer of the uppermost layer constituting each spacer portion is caused to be discontinuous with respect to the colored layer, thereby making it possible to easily narrow the spacer width as compared to the case where those colored layers are caused to be continuous. Thus, defect occurrence region on the substrate opposite to the color filter substrate by the spacer when the color filter substrate on which the spacers are formed and the substrate opposite thereto are caused to undergo positioning can be narrowed to more degree as compared to the case where the above-mentioned colored layers are caused to be continuous.

Further, in the case where these color filter substrates of this invention are assembled or mounted into the active matrix type liquid crystal display device including the substrate on which plural scanning lines and plural signal lines intersecting with each other, switching elements formed every these intersecting portions and pixel electrodes are disposed, this structure is very effective structure in such cases that color filter portion in the stripe form perpendicular to wiring, e.g., scanning lines is used and the spacers are disposed on the scanning lines, i.e., in the case where respective spacers are disposed on the colored layer pattern of the color filter portion. In addition, the spacer portions are disposed on the wiring such as scanning lines, etc., whereby they are formed in the non-pixel regions. Thus, the opening ratio becomes high.

In the active matrix type liquid crystal display device in which liquid crystal layer is put or held between two substrates of the matrix substrate and the opposite electrode substrate, there is employed the structure in which the color filter portion and the spacer portion are disposed at the matrix substrate side and wirings such as scanning lines or signal lines, etc. and switching elements are disposed with respect to the pixel electrodes through the respective colored layers, thereby making it possible to superimpose the pixel electrodes on the wiring, etc. through the respective colored layers. Thus, liquid crystal display device of high opening ratio can be obtained.

BRIEF DESCRIPTION OF THE DRAWINGS

FIG. 4A is a plan view of a matrix substrate of a liquid crystal display device of a third embodiment of this invention.

FIG. 4B is a plan view when colored layers are formed on the matrix substrate shown in FIG. 4A.

FIG. 5A is a cross sectional view cut along cutting lines X1–X1' shown in FIG. 4A.

FIG. 5B is a cross sectional view cut along cutting lines X2–X2' shown in FIG. 4A.

FIG. 5C is a cross sectional view cut along cutting lines X3–X3' shown in FIG. 4A.

DESCRIPTION OF THE PREFERRED EMBODIMENTS

Figure 1:
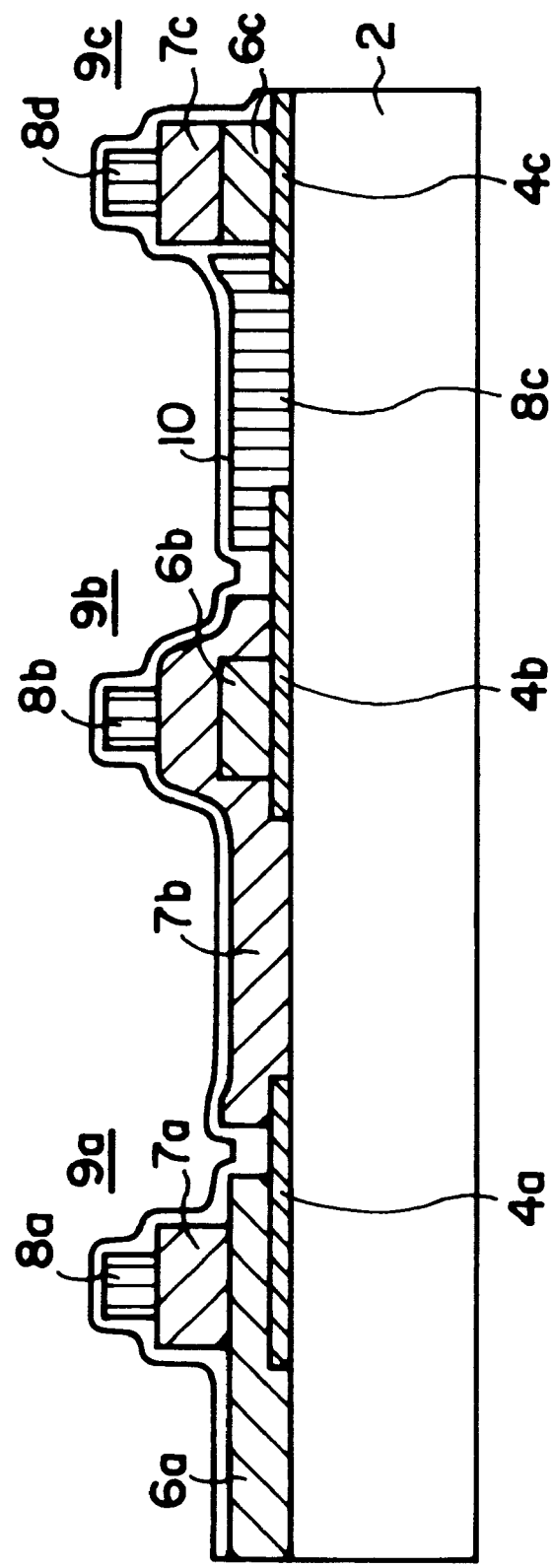
FIG. 1 is a cross sectional view showing the configuration of a first embodiment of a color filter substrate according to this invention.

A first embodiment of a color filter substrate according to this invention will now be described with reference to FIG. 1. The cross section of a color filter substrate used in the liquid crystal display device of this embodiment is shown in FIG. 1. This FIG. 1 is the cross sectional view in the case where liquid crystal display device shown in FIG. 3 which will be described later is cut along cutting lines X–X'. In the color filter substrate according to this invention, light shielding films 4a, 4b, 4c are formed in the regions where the spacer portions are formed on the substrate 2. Further, a colored layer 6a of red is formed on the pixel region where filter of red (R) is formed and the light shielding film 4a in a continuous manner. In this example, the colored layer 6a on the light shielding film 4a serves as the component of a spacer portion 9a. Moreover, colored layers 6b, 6c of red serving as components of spacer portions 9b, 9c are respectively formed also on the light shielding films 4b, 4c.

On the other hand, a colored layer 7b of green is continuously formed in such a manner to cover the pixel region where filter of green (G) is formed and the colored layer 6b on the light shielding film 4b. Moreover, a colored layer 7a of green is formed on the colored layer 6a of red on the light shielding film 4a, and a colored layer 7c of green is formed on the colored layer 6c of red on the light shielding film 4c.

Further, a colored layer 8c of blue is formed on the pixel region where filter of blue (B) is formed. Furthermore, a colored layer 8a of blue is formed on the colored layer 7a of green on the light shielding film 4a, a colored layer 8b of blue is formed on the colored layer 7b of green on the light shielding film 4b, and a colored layer 8d of blue is formed on the colored layer 7c of green on the light shielding film 4c. In addition, an electrode film 10 consisting of ITO (Indium Tin Oxide) is formed on the entire surface.

In the color filter substrate according to this embodiment, a spacer portion 9a is constituted by the colored layers 6a, 7a, 8a formed on the light shielding film 4a, a spacer portion 9b is constituted by the colored layers 6b, 7b, 8b formed on the light shielding film 4b, and a spacer portion 9c is constituted by the colored layers 6c, 7c, 8d formed on the light shielding film 4c. Accordingly, the spacer portions 9a and 9b are formed so that respective one colored layers 6a and 7b of the components thereof are continuous with the colored layers on the pixel regions, whereas the spacer portion 9c is formed so that all of the colored layers 6c, 7c, 8d of the components thereof are discontinuous with respect to the colored layer 8c on the pixel region. In addition, colored layers of the uppermost layers of the respective spacers 9a, 9b, 9c are disposed within the regions substantially in parallel to the substrate of the regions where other colored layers constituting these spacer portions overlap with each other.

Thus, it becomes possible to easily control the width dimensions of the uppermost layers of the spacer portions, particularly the width dimension of the uppermost layer of the spacer portion 9c. As a result, it is possible to prevent the spacer portion from being admitted into the pixel region. For this reason, the aperture ratio can be caused to be high and unsatisfactory display by unsatisfactory orientation can be prevented to the maximum degree.

A second embodiment of a liquid crystal display device according to this invention will now be described with reference to FIGS. 2 and 3. The liquid crystal display device of this embodiment is color type active matrix liquid crystal display device, wherein the color filter substrate shown in FIG. 1 is used as an opposite substrate. The cross section of the liquid crystal display device of this embodiment is shown in FIG. 2 and the plan view of the color filter substrate of this liquid crystal display device is shown in FIG. 3.

Figure 2:
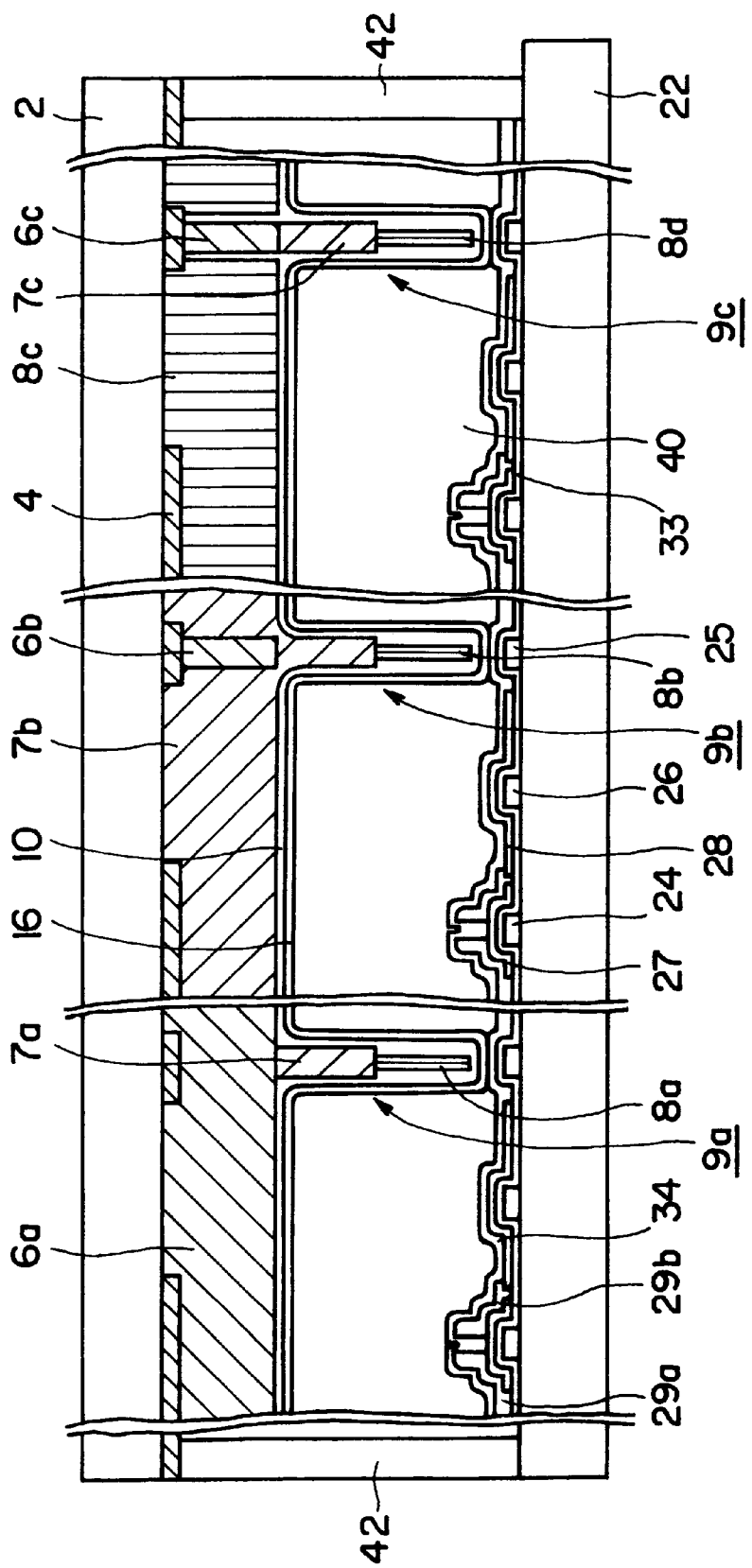
FIG. 2 is a cross sectional view showing the configuration of a second embodiment of a liquid crystal display device according to this invention.

In FIG. 2, the opposite substrate is such that an orientation films 16 is further formed on the electrode film 10 of the color filter substrate of the first embodiment shown in FIG. 1. On the other hand, a matrix substrate generally includes plural scanning lines and plural signal lines intersecting with each other, switching elements (TFTs (Thin Film Transistors)) formed every these intersecting portions, and pixel electrodes. And the matrix substrate is of a structure as described below. On a transparent substrate 22, gates 24, gate lines (scanning lines) 25 and storage capacitance lines 26 are respectively formed. The gates 24, the gate lines 25 and the storage capacitance lines 26 are covered by an insulating film 33. A semiconductor layer 27 serving as channel of TFT (Thin Film Transistor) is formed on each gate 24 through the insulating film 33. Moreover, metal layers 29a, 29b serving as source and drain regions of the TFT are formed at the upper portion of each semiconductor layer 27. Further, a pixel electrode 28 comprised of, e.g., ITO is formed in a manner to cover each storage capacitance line 26 through the insulating film 33. This pixel electrode 28 is electrically connected to respective one regions of the source and drain regions 29a, 29b. In addition, an orientation film 34 is formed on the source and drain regions 29a, 29b and each pixel electrode 28.

Figure 3:
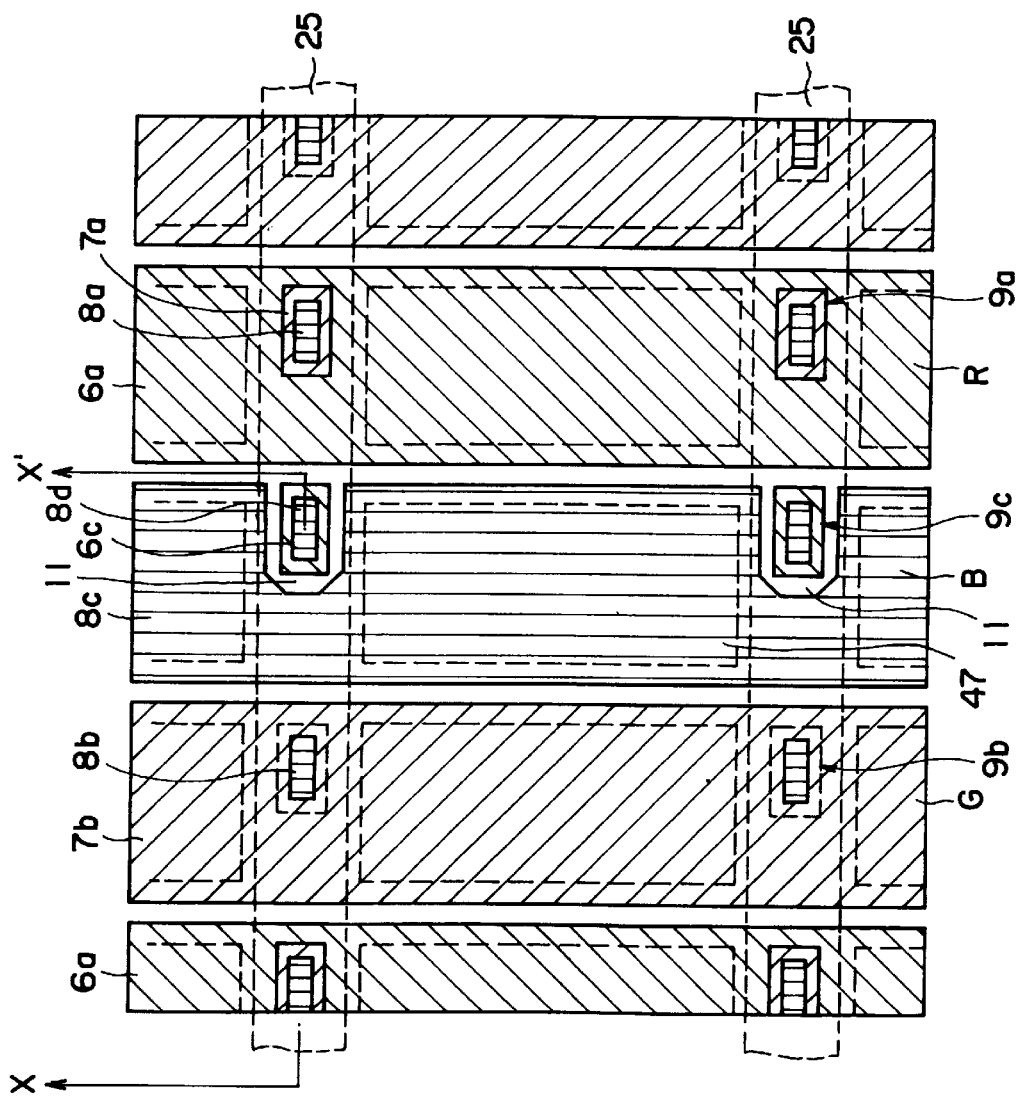
FIG. 3 is a plan view of a color filter substrate in the liquid crystal display device of the second embodiment.
Figure 6:
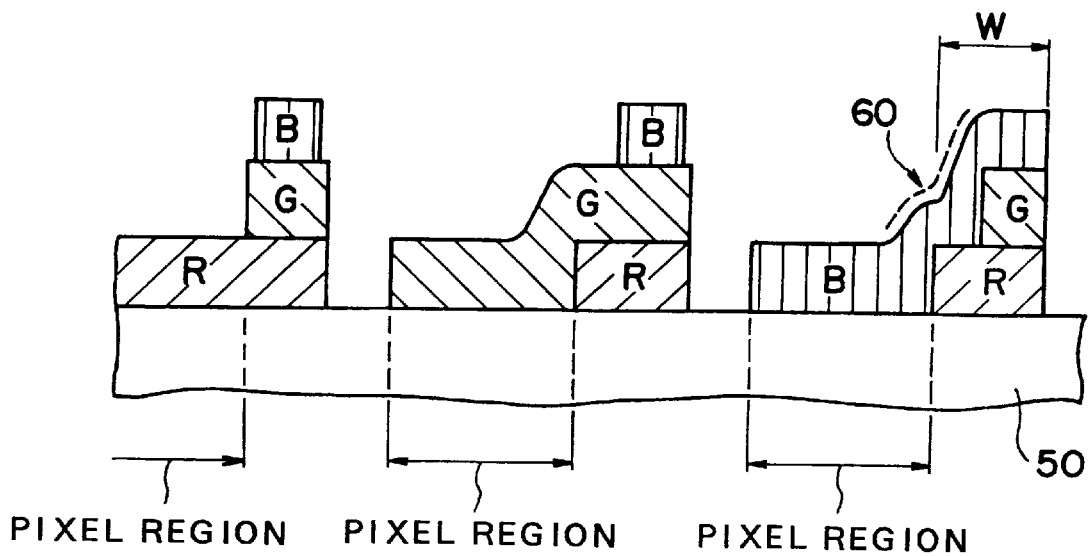
FIG. 6 is a cross sectional view for explaining the problems of the conventional liquid crystal display device.

In this example, the spacer portions composed of colored layers formed on the opposite substrate are disposed in a manner opposite to the scanning lines 25 of the matrix substrate as shown in FIG. 3. Moreover, pixel regions 47 of the same train are covered by the same colored layer, and the colored layers are disposed in a manner to take stripe pattern in order of the colored layer 6a of red (R), the colored layer 7b of green (G) and the colored layer 8c of blue (B) (see FIG. 3). Further, the opposite substrate and the matrix substrate are disposed in a manner to allow the spacer portions of the opposite substrate and the scanning lines 25 of the matrix substrate to be opposite to each other, and its periphery is fixed by an adhesive agent 42. Between these substrates, a liquid crystal 40 is hermetically sealed. It is to be noted that although not shown in FIG. 2, electrode transition layers for applying voltage to the opposite electrode 10 from the matrix substrate are formed at the periphery of the adhesive agent 42.

In accordance with the liquid crystal display device of the second embodiment, the spacer portions are formed by stacking colored layers used for forming color filters. As these spacer portions, spacer portions in which one colored layer except for the uppermost layer which is the component thereof is continuous in a manner to cover the pixel region 47 (see FIG. 3) (e.g., spacer portions 9a, 9b) and spacer portion in which all colored layers which are the components are formed in a manner discontinuous with respect to the colored layer which covers the pixel region (e.g., spacer portion 9c) exist in a mixed state. Thus, it becomes possible to easily control the width dimension of the uppermost layer of each spacer portion. As a result, the aperture ratio can be prevented from being reduced as far as possible. For this reason, it can be prevented that the width dimension of the spacer portion is widened so that it is admitted into the pixel region. Thus, unsatisfactory display by unsatisfactory orientation can be prevented as far as possible. In this example, the colored layer pattern 8c of the same color as that of the colored layer 8d of the uppermost layer constituting the spacer portion 9c includes an opening portion 11, and the spacer portion 9c is disposed at this opening portion 11 (see FIG. 3).

A method of manufacturing the liquid crystal display device of the second embodiment will now be described.

The matrix substrate (including transparent substrate) 22 is formed by using the well known method. In this case, the orientation film 34 on the matrix substrate is formed by coating orientation film material so that the film thickness becomes equal to 500 angstroms to carry out rubbing processing.

A method of manufacturing the opposite substrate 2 will now be described. Photosensitive black resin is coated by using spinner on a substrate to dry it under the condition of 90° C. and 10 minutes thereafter to allow it to be exposed to light under the condition of wavelength of 365 nm and exposure quantity of 300 mJ/cm² by using photomask in a predetermined pattern form. Thereafter, development is made by alkali aqueous solution of pH 11.5 to form light shielding film 4 of film thickness of 2.0 μm by baking under the condition of 200° C. and 60 minutes. Then, ultraviolet hardening type acrylic resin resist in which pigments of red are dispersed is coated on the entire surface by means of spinner to irradiate light under the condition of wavelength of 365 nm and 100 mJ/cm² through a photomask such that light is irradiated onto the portions desired to be colored red including the portions where spacers are desired to be formed to conduct development for 10 seconds by using 1% aqueous solution of KOH thus to form colored layers 6a, 6b, 6c of red. In this case, the spacers are disposed at the portions opposite to the scanning lines 25 of the opposite active matrix substrate 22 and at the portions except for the portions overlapping with the pixel electrodes 28.

Then, ultraviolet hardening type acrylic resin resist in which pigments of green are dispersed is used to form colored layers 7a, 7b, 7c of green similarly to the above-described case. Subsequently, ultraviolet hardening type acrylic resin resist in which pigments of blue are dispersed is used to form colored layers 8a, 8b, 8c, 8d similarly to the above-described case.

Thereafter, ITO film is formed as the electrode film 10 by the sputter method so that the film thickness becomes equal to the thickness of 1500 angstroms to form thereon orientation film material similar to the above thereafter to carry out rubbing processing to form orientation film 16. Thereafter, adhesive agent 42 is printed along the periphery of the substrate 2 except for inlet (not shown). Then, the substrates 2, 22 are disposed so that the orientation films 16, 34 are opposite to each other and angles in respective rubbing direction become equal to 90 degrees to heat them so that the adhesive agent is hardened to stick the substrates 2, 22 to each other. Then, liquid crystal composition 40 is injected from the inlet by the ordinary method thereafter to seal the inlet by ultraviolet hardening resin. The color display type active matrix liquid crystal display device formed in this way has good uniformness of gap of cell. Thus, display having high contrast and good quality was obtained.

A third embodiment of a liquid crystal display device according to this invention will now be described with reference to FIGS. 4A and 4B, and FIGS. 5A, 5B and 5C. The liquid crystal display device of this embodiment is a color type active matrix liquid crystal display device, and is adapted so that color filters composed of colored layers are provided on the matrix substrate. The plan view of the matrix substrate of the liquid crystal display device of this embodiment is shown in FIG. 4A, and the plan view in the case where colored layers are formed on the matrix substrate is shown in FIG. 4B. In addition, cross sectional views when cut along cutting lines X1–X1', cutting lines X2–X2', cutting lines X3–X3' shown in FIG. 4A are respectively shown in FIGS. 5A, 5B and 5C.

The matrix substrate is adapted so that gate electrodes 24 and gate lines (scanning lines) 25 are formed on a transparent substrate 32, and signal lines 31 are formed in a direction substantially perpendicular to the gate lines 25. The regions encompassed by the gate lines 25 and the signal lines 31 respectively serve as pixel regions. Respective the same pixel trains are covered by respective the same colored layers, wherein the colored layers are disposed in a manner to take stripe pattern in order of the colored layer 6a of red (R), the colored layer 7b of green (G), and the colored layer 8c of blue (B).

Moreover, pixel electrodes 28 are formed through colored layers on respective pixel regions, and these pixel electrodes 28 are connected to respective metal layers 29b serving as the source region or the drain region of TFT through through-holes 23 provided at the colored layers (see FIGS. 5A, 5B, 5C).

Further, spacer portions 9a, 9b, 9c are provided on the respective gate lines 25. The spacer portion 9a provided within the pixel train covered by the colored layer 6a of red is composed of colored layer 6a of red, colored layer 7a of green and colored layer 8a of blue as shown in FIG. 5A.

Furthermore, the spacer portion 9b provided within the pixel train covered by the colored layer 7b of green is composed of colored layer 6b of red, colored layer 7b of green and colored layer 8b of blue as shown in FIG. 5B. In addition, the spacer portion 9c is provided within the pixel train covered by colored layer 8c of blue, and is composed of colored layer 6c of red, colored layer 7c of green and colored layer 8d of blue as shown in FIG. 5C.

Accordingly, in the spacer 9a, the colored layer 6a serving as the component is formed in a manner to become continuous with the colored layer 6a which covers the pixel region. Similarly, in the spacer 9b, the colored layer 7b serving as the component is formed in a manner to become continuous with colored layer 7b which covers the pixel region. On the contrary, in the spacer portion 9c, all of colored layers serving as the components are formed in a manner to become discontinuous with respect to colored layer 8c which covers the pixel region. In this example, the colored layer pattern 8c of the same color (blue) as that of the colored layer 8d of the uppermost layer constituting the spacer portion 9c includes opening portion 11, and the spacer portion 9c is disposed at the opening portion 11 (see FIGS. 4A, 4B).

Figure 7:
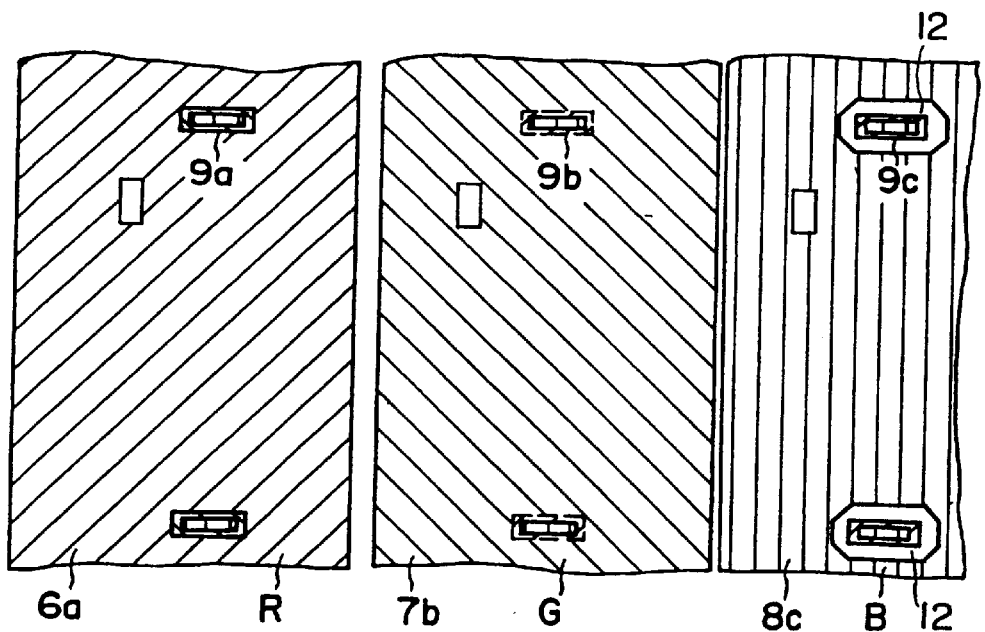
FIG. 7 is a plan view showing a modified example of the third embodiment.

It is to be noted that while portion in cut form is used as the opening portion in this embodiment, even if spacer 9c is disposed at a hole-shaped opening portion 12 formed within the pattern region of the colored layer 8c as shown in FIG. 7, similar advantages can be obtained. However, from a viewpoint of patterning accuracy, employment of the cut shaped opening portion is preferable in that the defect occurrence ratio that the colored layer of the color filter portion and the colored layer of the spacer portion are continuous is low.

Thus, similarly to the liquid crystal display device of the second embodiment, the liquid crystal display device of this embodiment can easily control the width dimension of the uppermost layer of the spacer portion. As a result, the opening ratio can be prevented from being reduced as far as possible. For this reason, it can be prevented that the width of the spacer portion is widened so that it is admitted into the pixel region. Thus, unsatisfactory display by unsatisfactory orientation can be prevented to the maximum degree.

Figure 8:
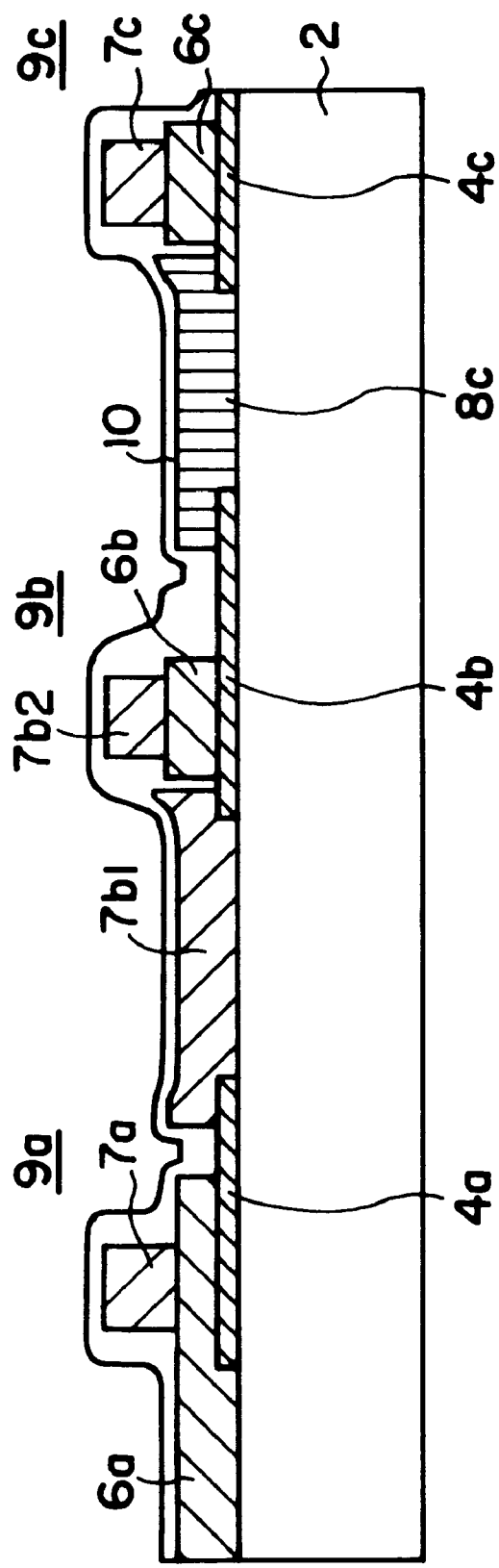
FIG. 8 is a cross sectional view showing the configuration of another embodiment of the color filter substrate according to this invention.

It is to be noted that while the spacer portions are adapted so that colored layer of red, colored layer of green and colored layer of blue are formed in order recited in the above-described first to third embodiments, it is a matter of course that such order may be changed. In addition, while the spacer portions are formed by stacking colored layers of three colors, they may be formed by stacking colored layers of two colors as shown in FIG. 8. In this case, the colored layer of the upper layer constituting the spacer portion is disposed within the region substantially in parallel to the substrate of the colored layer of the lower layer constituting the spacer portion.

It is to be further noted that while explanation has been given by using the active matrix liquid crystal display device in the above-described second and third embodiments, it is a matter of course that this invention may be applied also in the case of the simple matrix liquid crystal display device.

As described above, in accordance with this invention, the color filter substrate and the liquid crystal display device having high opening ratio and capable of preventing unsatisfactory display to the maximum degree can be provided.

What is claimed is:

1. A color filter substrate comprising:
   a substrate;
   a color filter portion having colored layers of plural colors disposed on the substrate;
   a first spacer portion having colored layers stacked on the substrate, wherein the stacked colored layers have at least two of the colors in the colored filter portion, and one of the stacked colored layers is continuous with and the same color as a colored layer of the color filter portion; and
   a second spacer portion having colored layers stacked on the substrate, wherein the stacked colored layers have at least two of the colors in the colored filter portion, and all of the stacked colored layers are discontinuous with each colored layer of the color filter portion.

2. A color filter substrate as set forth in claim 1, wherein the colored layer of the colored filter portion that has the same color as an uppermost layer constituting the second spacer portion has an opening portion, and the second spacer portion is disposed at the opening portion.

3. A color filter substrate as set forth in claim 2, wherein the second spacer portion is adapted so that colored layers of two colors are stacked, and the upper layer constituting the second spacer portion is disposed within a region substantially in parallel to the substrate of the colored layer of the lower layer constituting the second spacer portion.

4. A color filter substrate as set forth in claim 2, wherein the first spacer portion and the second spacer portion are adapted so that colored layers of three colors or more are stacked, and the colored layer of the uppermost layer constituting the spacer portion is disposed within a region substantially in parallel to the substrate of a region where other colored layers constituting the spacer portion overlap with each other.

5. A color filter substrate as set forth in claim 1, wherein the second spacer portion is adapted so that colored layers of two colors are stacked, and the upper layer constituting the second spacer portion is disposed within a region substantially in parallel to the substrate of the colored layer of the lower layer constituting the second spacer portion.

6. A color filter substrate as set forth in claim 1, wherein the first spacer portion and the second spacer portion are adapted so that colored layers of three colors or more are stacked, and the colored layer of the uppermost layer constituting the spacer portion is disposed within a region substantially in parallel to the substrate of a region where other colored layers constituting the spacer portion overlap with each other.

7. A color filter substrate as set forth in claim 1, wherein the colored layers constituting the color filter portion take stripe form.

8. A liquid crystal display device comprising:
   an electrode substrate having a first electrode on a first substrate;
   a color filter portion having colored layers of plural colors disposed on a second substrate;
   a color filter substrate including a first spacer portion having colored layers stacked on the second substrate, wherein the stacked colored layers have at least two of the colors in the colored filter portion and one of the stacked colored layers is continuous with and the same color as a colored layer of the color filter portion, a second spacer portion having colored layers stacked on the second substrate, wherein the stacked colored layers have at least two of the colors in the colored filter portion and all of the stacked colored layers are discontinuous with each colored layer of the color filter portion, and a second electrode; and
   a liquid crystal layer interposing between the electrode substrate and the color filter substrate.

9. A liquid crystal display device as set forth in claim 8, wherein the colored layer of the colored filter portion that has the same color as an uppermost layer constituting the second spacer portion has an opening portion, and the second spacer portion is disposed at the opening portion.

10. A liquid crystal display device comprising:
    a matrix substrate including plural scanning lines and plural signal lines disposed in a matrix form on a first substrate, switching elements formed at intersecting portions of the scanning lines and the signal lines, and connected at one end to the signal lines to carry out ON/OFF operations on the basis of signals from the scanning lines, and plural pixel electrodes connected to the other end of each switching element;

a color filter substrate including a color filter portion having stripe-shaped colored layers of plural colors formed in a manner to correspond to the pixel electrodes and to take a form substantially in parallel to the signal lines on a second substrate, a first spacer portion having colored layers stacked on the second substrate, wherein the stacked colored layers have at least two of the colors in the colored filter portion and one of the stacked colored layers is continuous with and the same color as a colored layer of the color filter portion, a second spacer portion having colored layers stacked on the second substrate, wherein the stacked colored layers have at least two of the colors in the colored filter portion and all of the stacked colored layers are discontinuous with each colored layer of the color filter portion, and an opposite electrode; and a liquid crystal layer interposing between the electrode substrate and the color filter substrate.

11. A liquid crystal display device as set forth in claim 10, wherein the colored layer of the colored filter portion that has the same color as an uppermost layer constituting the second spacer portion has an opening portion, and the second spacer portion is disposed at the opening portion.

12. A liquid crystal display device as set forth in claim 10, wherein, the first and second spacer portions are disposed on the corresponding scanning lines.

13. A liquid crystal display device comprising:

a matrix substrate including plural scanning lines and plural signal lines disposed in a matrix form on a first substrate, switching elements formed at intersecting portions of the scanning lines and the signal lines, and connected at one end to the signal lines to carry out ON/OFF operations on the basis of signals from the scanning lines, a color filter portion having colored layers of plural colors which cover substantially the entire surface of the first substrate including the scanning lines, the signal lines and the switching elements, a first spacer portion having colored layers stacked on the first substrate, wherein the stacked colored layers have at least two of the colors in the colored filter portion and one of the stacked colored layers is continuous with and the same color as a colored layer of the color filter portion, a second spacer portion having colored layers stacked on the first substrate, wherein the stacked colored layers have at least two of the colors in the colored filter portion and all of the stacked colored layers are discontinuous with each colored layer of the color filter portion, and pixel electrodes provided on the color filter portion and connected to the other end of the switching elements by through-holes provided in the colored layers of the colored filter portion;

an opposite electrode substrate adapted so that an opposite electrode is formed on a second substrate; and a liquid crystal layer interposing between the electrode substrate and the color filter substrate.

14. A liquid crystal display device as set forth in claim 13, wherein the colored layer of the colored filter portion that has the same color as an uppermost layer constituting the second spacer portion has an opening portion, and the second spacer portion is disposed at the opening portion.

15. A liquid crystal display device as set forth in claim 13, wherein the colored layers constituting the color filter portion take stripe form.

16. A liquid crystal display device as set forth in claim 15, wherein the first and second spacer portions are disposed on the corresponding scanning lines.

\* \* \* \* \*